US012537551B2

(12) United States Patent
Bailey

(10) Patent No.: US 12,537,551 B2
(45) Date of Patent: Jan. 27, 2026

(54) MULTI-LEVEL SIGNAL DISTRIBUTION DEVICE WITH ENHANCED ISOLATION

(71) Applicant: PPC BROADBAND, INC., East Syracuse, NY (US)

(72) Inventor: Paul Bailey, Camillus, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 426 days.

(21) Appl. No.: 18/146,100

(22) Filed: Dec. 23, 2022

(65) Prior Publication Data

US 2023/0208460 A1     Jun. 29, 2023

Related U.S. Application Data

(60) Provisional application No. 63/293,176, filed on Dec. 23, 2021.

(51) Int. Cl.
*H04B 1/10* (2006.01)

(52) U.S. Cl.
CPC ......... *H04B 1/1027* (2013.01); *H04B 1/1009* (2013.01); *H04B 2001/1045* (2013.01)

(58) Field of Classification Search
CPC ......... H04N 7/104; H01P 5/19; H04B 1/1009; H04B 1/1027; H04B 2001/1045
See application file for complete search history.

(56) References Cited

U.S. PATENT DOCUMENTS

| | | | |
|---|---|---|---|
| 11,201,381 B1* | 12/2021 | Mruk | H01Q 21/0006 |
| 2010/0162340 A1 | 6/2010 | Riggsby | |
| 2019/0221974 A1* | 7/2019 | Bailey | H01R 24/547 |
| 2019/0230399 A1* | 7/2019 | Bailey | H04N 21/4112 |
| 2021/0243406 A1* | 8/2021 | Bailey | H01P 5/12 |

OTHER PUBLICATIONS

International Search Report and Written Opinion dated Mar. 31, 2023 in corresponding International Application No. PCT/US2022/053958, 19 pages.
Bhaskar et al. "1 to 4 Wideband Power Divider using Substrate Integrated Waveguide and Modified Wilkinson Structures," 2018 IEEE International Symposium on Electromagnetic Compatibility and 2018 IEEE Asia-Pacific Symposium on Electromagnetic Compatability (EMC/APEMC), IEEE, May 14, 2018, 4 pages.
Mohammed et al. "Four-way Waveguide Power Dividers with Integrated Filtering Function," 2015 European Microwave Conference (EUMC), EUMA, Sep. 7, 2015, 4 pages.

(Continued)

*Primary Examiner* — Nguyen T Vo
(74) *Attorney, Agent, or Firm* — MH2 Technology Law Group, LLP

(57) ABSTRACT

A multi-level signal distribution device provides different enhanced isolation levels at a plurality of different frequency bands and may include an input port, a plurality of output ports, a splitter configured to be connected between the input port and the output ports and a filter. The filter is configured to provide the plurality of enhanced isolation levels between the input port and the output ports. The device is also configured to provide enhanced isolation levels between adjacent output ports and between distant output ports.

25 Claims, 7 Drawing Sheets

(56) References Cited

OTHER PUBLICATIONS

International Search Report and Written Opinion in corresponding International Application No. PCT/US2022/053958 mailed on Mar. 31, 2023, 18 pages.
Bhaskar et al. "1 to 4 Way Wideband Power Divider using Substrate Integrated Waveguide and Modified Wilkinson Structures," 2018 IEEE International Symposium on Electromagnetic Compatibility and 2018 IEEE Asia-Pacific Symposium on Electromagnetic Compatibility (EMC/APEMC), IEEE, May 14, 2018, pp. 554-557.
Mohammed et al. "Four-way Waveguide Power Dividers with Integrated Filtering Function," 2015 European Microwave Conference (EUMC), EUMA, Sep. 7, 2015, pp. 486-489.

* cited by examiner

MULTI-LEVEL SIGNAL DISTRIBUTION DEVICE WITH ENHANCED ISOLATION

CROSS-REFERENCE TO RELATED APPLICATIONS

This application claims priority to U.S. Provisional Patent Application No. 63/293,176, filed on Dec. 23, 2021, the disclosure of which is incorporated herein by reference in its entirety.

BACKGROUND

A Wilkinson circuit (also referred to as a signal splitter or a power divider) is a type of circuit that can split an input signal between a plurality of output ports with a predetermined transmission response and achieve certain types of isolation between the output ports. The signal splitter can also be used as a power combiner which adds the output port signals together and can deliver the added signals at the input port. Because such a signal splitter often has a band limited design, it may be used in other applications such as filtering with controllable attenuation and isolation profiles across the frequency spectrum.

However, conventional Wilkinson splitters and other types of splitter devices, such as ferrite-based splitters, often suffer from excessive isolation levels between the output ports. Additionally, conventional Wilkinson splitters and other types of splitters, such as ferrite-based splitters, may have non-uniform levels of isolation between the different output ports. This may lead to excessive isolation on the output signals or inconsistent network reliability.

Furthermore, conventional ferrite-based splitters and other types of splitters, such as resistive splitters, may have a high level of insertion loss. This may result in degradation of the signal between the input port and the output ports.

Accordingly, it may be desirable to provide an improved splitter with improved isolation between the input port and the output ports, between the output ports and with improved insertion loss.

SUMMARY

In some embodiments, a multi-level signal distribution device may include an input portion, a plurality of output portions, a splitter portion configured to split signals between the input portion and the plurality of output portions, and a filter portion configured to provide a first enhanced isolation level between the input portion and the plurality of output portions at a first frequency band, a second enhanced isolation level between the input portion and the plurality of output portions at a second frequency band, and a third enhanced isolation level between the input portion and the plurality of output portions at a third frequency band. The first enhanced isolation level, the second enhanced isolation level, and the third enhanced isolation level are different from one another. The first frequency band, the second frequency band, and the third frequency band are different from one another.

In some embodiments, a multi-level signal distribution device may include an input portion, a plurality of output portions, a splitter portion configured to split signals between the input portion and the plurality of output portions, and a filter portion configured to provide a first enhanced isolation level between the input portion and the plurality of output portions at a first frequency band, a second enhanced isolation level between the input portion and the plurality of output portions at a second frequency band, and a third enhanced isolation level between the input portion and the plurality of output portions at a third frequency band. The first enhanced isolation level, the second enhanced isolation level, and the third enhanced isolation level are different from one another. The first frequency band, the second frequency band, and the third frequency band are different from one another. The splitter portion comprises a plurality of splitter portions. The filter portion is configured to provide a first adjacent output portion enhanced isolation level between adjacent ones of the plurality of output portions and a first distant output portion enhanced isolation level between distant ones of the plurality of output portions in a fourth frequency band. The filter portion is configured to provide a second adjacent output portion enhanced isolation level between the adjacent ones of the plurality of output portions and a second distant splitter output portion enhanced isolation level between the distant ones of the plurality of output portions in the third frequency band. The adjacent output portions comprise output portions that receive signals from a same one of the plurality of splitter portions. The distant output portions comprise output portions that receive signals from different ones of the plurality of splitter portions.

In some embodiments, a multi-level signal distribution device may include an input portion, a plurality of output portions, a splitter portion configured to split signals between the input portion and the plurality of output portions, a high pass filter portion configured to filter signals received from the input portion, a capacitive filter portion configured to capacitively filter signals between the high pass filter portion and the splitter portion, and an output filter portion configured to filter output signals output from the splitter portion to the plurality of output portions. The high pass filter portion, the capacitive filter portion, and the output filter portion are configured to provide a first enhanced isolation level between the input portion and the plurality of output portions in a first frequency band. The high pass filter portion, the capacitive filter portion, and the output filter portion are configured to provide a second enhanced isolation level between the input portion and the plurality of output portions in a second frequency band. The second frequency band is different from the first frequency band. The high pass filter portion, the capacitive filter portion, and the output filter portion are configured to provide a third enhanced isolation level between the input portion and the plurality of output portions in a third frequency band. The third frequency band is different from the first frequency band and the second frequency band. The splitter portion comprises a plurality of splitter portions. The high pass filter portion, the capacitive filter portion, and the output filter portion are configured to provide a first adjacent output portion enhanced isolation level between adjacent ones of the plurality of output portions in a fourth frequency band. The adjacent ones of the plurality of output portions comprise output portions that receive signals from a same one of the plurality of splitter portions. The high pass filter portion, the capacitive filter portion, and the output filter portion are configured to provide a first distant output portion enhanced isolation level in the fourth frequency band between distant ones of the plurality of output portions. The distant ones of the plurality of output portions comprise output portions that receive signals from different ones of the plurality of splitter portions. The high pass filter portion, the capacitive filter portion, and the output filter portion are configured to provide a second adjacent output portion enhanced isolation level between the adjacent ones of the plurality of output portions in the third frequency band. The high pass filter portion, the capacitive filter portion, and the output filter portion are configured to provide a second distant output portion enhanced isolation level between the distant ones of the plurality of output portions in the third frequency band. The first adjacent output port enhanced isolation level and the first distant output port enhanced isolation level comprise greater than a 60 dB isolation level. The second adjacent output port enhanced isolation level and the second distant output port enhanced isolation level comprise less than a 13 dB isolation level. The high pass filter comprises a resistive element configured to provide a predetermined reflection level to the input portion in a fifth frequency band. The predetermined reflection level comprises a greater than 18 dB reflection level and the fifth frequency band comprises a 5 MHz to 1000 MHz frequency band It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and, together with the description, serve to explain the principles of the present teachings. In the figures.

DETAILED DESCRIPTION

The present disclosure relates to a multi-level signal distribution device, which in some embodiments may be a splitter device. In some embodiments, the present disclosure relates to a MoCA splitter device. The splitter device may include an N-way splitter, such as a 2-way splitter, a 3-way splitter, a 4-way splitter, or an N-way splitter that provides enhanced insertion loss, enhanced return loss and enhanced isolation levels when compared to conventional splitter devices.

Figure 1:
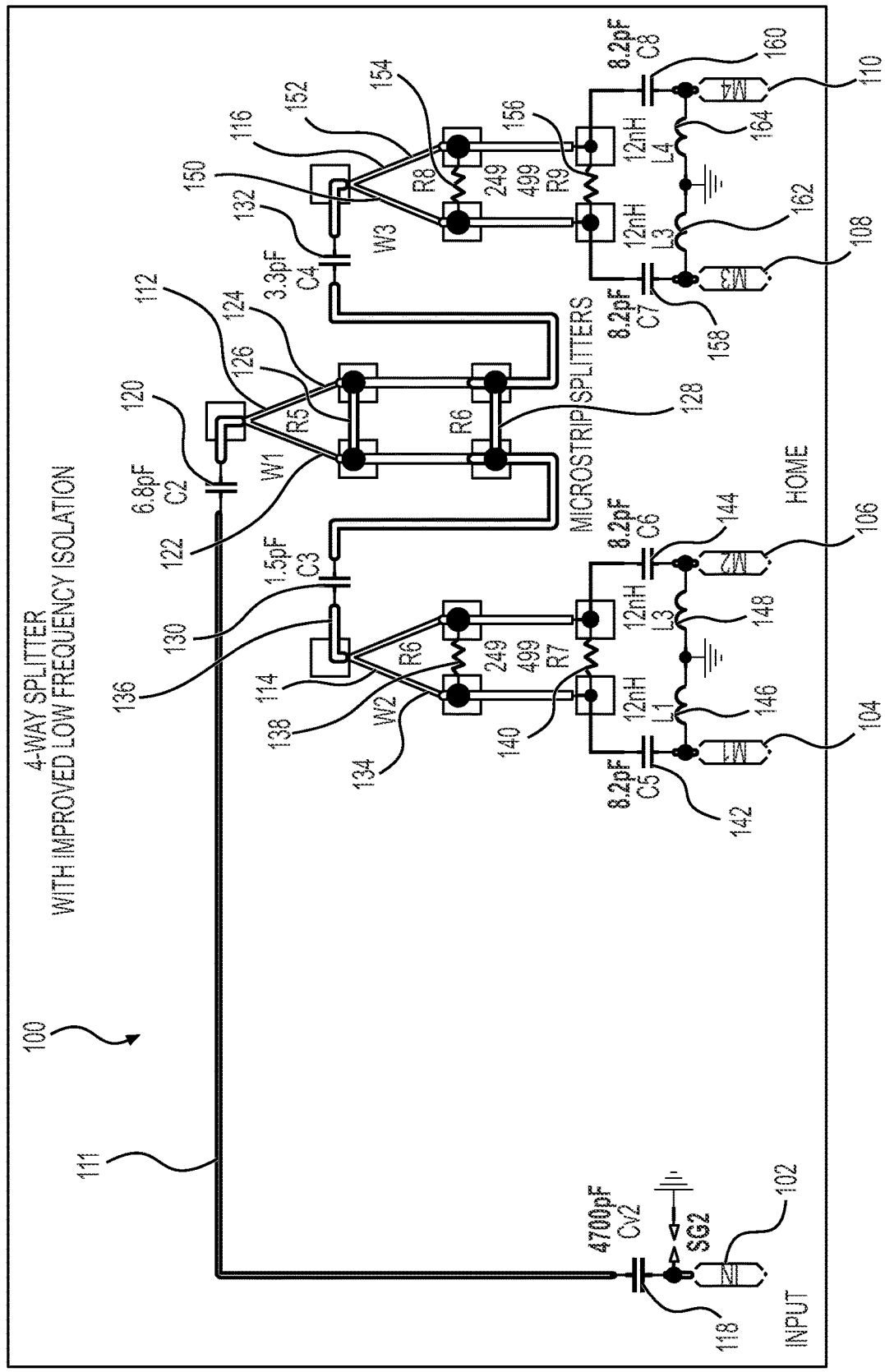
FIG. 1 illustrates a schematic view of a four-way splitter device in accordance with aspects of the present disclosure.

FIG. 1 illustrates a schematic view of a four-way, splitter device (multi-level signal distribution device) 100 according to an embodiment. The splitter device 100 includes an input port or input portion 102, a first output port or output portion 104, a second output port or output portion 106, a third output port or output portion 108 and a fourth output port or output portion 110. A transmission line 111 connects the input port 102 to the first, second, third and fourth output ports 102, 104, 106 and 108. The splitter device 100 also includes a first splitter or splitter portion 112, a second splitter or splitter portion 114 and a third splitter or splitter portion 116. In some embodiments, the splitter device 100 may be a MoCA splitter device that splits MoCA frequency band signals (1125-1675 MHz), although other types of splitter devices may be utilized using other frequency bands. As another example of frequency band signals that could be used with the splitter of various embodiments, signals centered on a 2.3 GHz frequency band could be used such as a 2.1-2.5 GHz frequency band.

A first capacitor 118 and a second capacitor 120 may be disposed along the transmission line 111 between the input port 102 and the first splitter 112. In some embodiments, the first capacitor 118 may have a 4700 pF capacitance and the second capacitor 120 may have a 6.8 pF capacitance, although other capacitance values could be used. The second capacitor 120 may be configured as a capacitive filter.

The first splitter 112 is connected to a downstream side of the second capacitor 120. The first splitter 112 includes a first transmission line 122 and a second transmission line 124. The first transmission line 122 is configured as a first output of the first splitter and is configured to connect the first splitter 112 to the second splitter 114. The second transmission line 124 is configured as a second output of the first splitter and is configured to connect the first splitter 112 to the third splitter 116.

The first splitter 112 also includes a first isolation element 126 connected between the first transmission line 122 and the second transmission line 124. A second isolation element 128 is connected between the first transmission line 122 and the second transmission line 124, with the second isolation element 128 being positioned downstream (closer to the output ports 104, 108) than the first isolation element 126. The first isolation element 126 and the second isolation element may be resistors in some embodiments.

A third capacitor 130 may be disposed along the first transmission line between the first splitter 112 and the second splitter 114. A fourth capacitor 132 may be disposed along the second transmission line between the first splitter 112 and the third splitter 116. In some embodiments, the third capacitor 130 may be a 1.5 pF capacitor and the fourth capacitor 132 may be a 3.3 pF capacitor, although other capacitor values could be used. The third and fourth capacitors may be configured as capacitive filters.

The second splitter 114 includes an input that is split into a third transmission line 134 and a fourth transmission line 136. The third transmission line 134 is configured as a first output of the second splitter 114 and is configured to connect the second splitter 114 to the first output port 104. The fourth transmission line 136 is configured as a second output of the second splitter 114 and is configured to connect the second splitter 114 to the second output port 106. The second splitter also includes a third isolation element 138 and a fourth isolation element 140, which in some embodiments may be resistors. The third isolation element 138 and the fourth isolation element 140 that are connected between the third transmission line 134 and the fourth transmission line 136.

The second splitter 114 may have its first and second outputs connected to an output filter or output filter portion that includes a capacitor 142 connected to the third transmission line 134 between the fourth isolation element 140 and first output port or first output portion 104, and a capacitor 144 connected to the fourth transmission line 136 between the fourth isolation element 140 and second output port or second output portion 106. The output filter also includes inductor 146 connected between the capacitor 142 and the output port 104 and to ground and a inductor 148 connected between the capacitor 144 and output port 106 and to ground. In some embodiments, the first inductor 146 and the second inductor 148 may both be 12 nH, although different value inductors could be used.

The third splitter 116 includes a fifth transmission line 150 and a sixth transmission line 152. The fifth transmission line 150 is configured to connect the third splitter 116 to the third output port or third output portion 108. The sixth transmission line 152 is configured to connect the third splitter 116 to the fourth output port or third output portion 110. The third splitter 116 also includes a fifth isolation element 154 and a sixth isolation element 156, which in some embodiments may be resistors. The fifth isolation element 154 and the sixth isolation element 156 are connected between the fifth transmission line 150 and the sixth transmission line 152.

An output filter or output filter portion is connected to first and second outputs of the third splitter 116. The output filter includes capacitor 158 connected to the fifth transmission line 150 between the sixth isolation element 156 and third output port 108, and capacitor 160 connected to the sixth transmission line 152 between the sixth isolation element 156 and fourth output port 110. The output filter also includes inductor 162 connected between the capacitor 158 and the output port 108 and ground and an inductor 164 connected between the capacitor 160 and output port 110 and ground. In some embodiments, the inductor 162 and the inductor 164 may both be 12 nH, although different value inductors could be used.

The splitter device 100 includes capacitive filter 120 configured to connect between the input port 102 and the first splitter 112, the first output 104 configured to connect to the first output filter (capacitors 142 and 144 and inductors 146 and 148) and includes the second output port 106 configured to connect to a second output filter (capacitors 158 and 160 and inductors 162 and 164 to increase the low frequency (0 MHz to 200 MHz) isolation and to improve low frequency transient and surge suppression. As can be seen with reference to FIG. 4, the low frequency (0 MHz to 200 MHz) isolation of the splitter device 100 is enhanced to be greater than 40 dB.

While a 4-way splitter device is illustrated, embodiments may include an N-way splitter device with any number of output ports. For example, a 2-way splitter device may be utilized, which could include the first output port 104, the second output port 106 and the second splitter 114 and the first output filter, without the first splitter 112 or the third splitter 116. In such a 2-way splitter, the capacitor 120 is connected directly to the second splitter 114.

Figure 2:
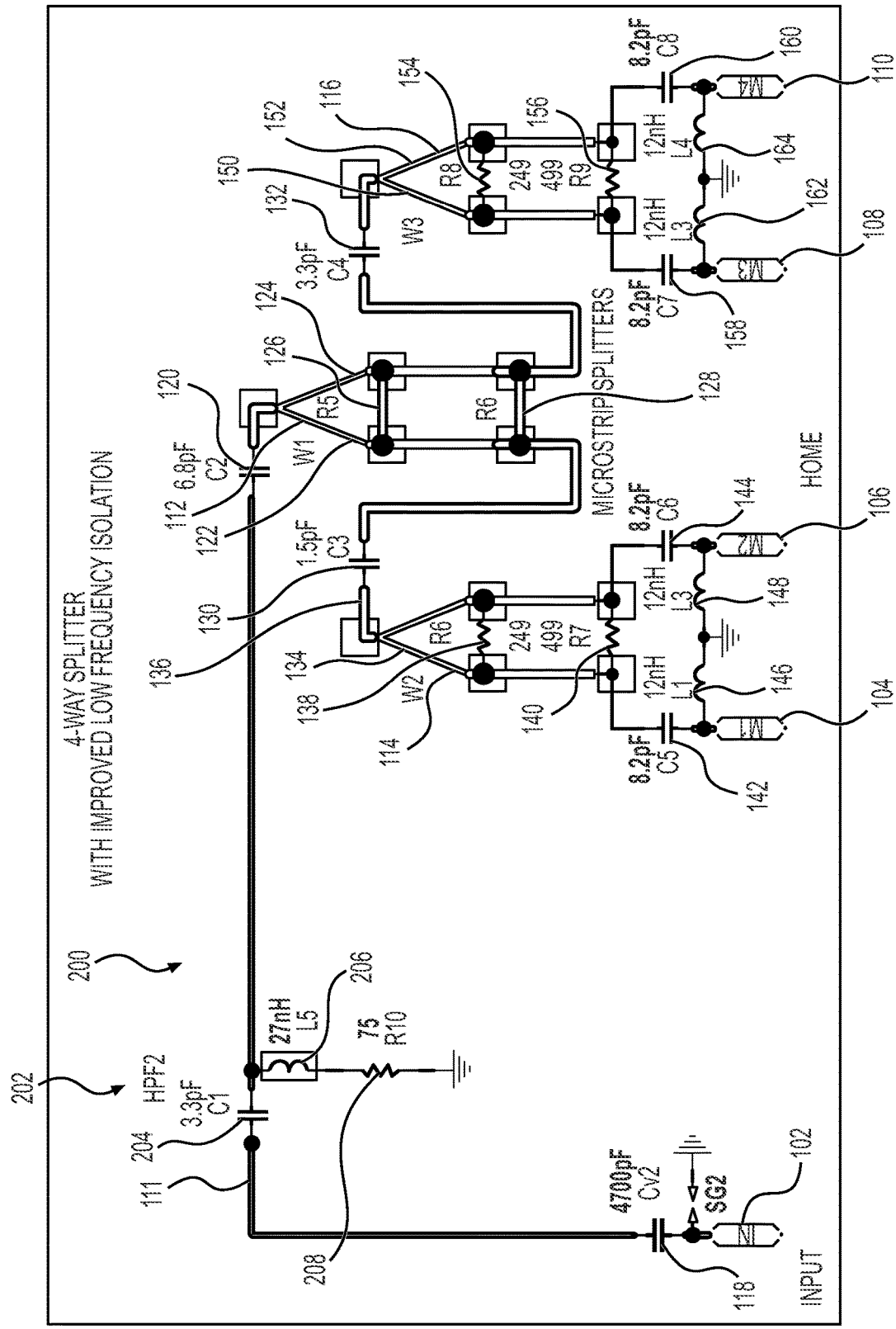
FIG. 2 illustrates a schematic view of a four-way splitter device in accordance with aspects of the present disclosure.

FIG. 2 illustrates a schematic view of a four-way splitter device 200 according to other exemplary embodiments of the disclosure. Elements of the four-way splitter device 200 that are common with and connected in a same manner as in the splitter device 100 of FIG. 1 share like reference numerals. The splitter device 200 also includes a high pass filter or high pass filter portion (HPF) 202. The HPF 202 includes a capacitor 204, an inductor 206 and a resistor 208. The capacitor 204 is disposed along transmission line 111 between capacitors 118 and 120. The inductor 206 is connected to the transmission line 111 downstream from the capacitor 204 and upstream from capacitor 120. The resistor 208 is connected between the inductor 206 and a ground and is configured as an absorptive resistor to minimize reflections in the splitter device 200. In some embodiments, the resistive element is configured to provide a predetermined reflection level of greater than 18 dB to the input portion in a 5 MHz to 1000 MHz frequency band.

The HPF 202 (in combination with the capacitive filter 120 and the output filters including filtering elements 120, 130, 132, 142, 144, 146, 148, 158, 160, 162 and 164) may collectively be referred to as a filter portion that is configured to provide enhanced isolation between the input port 102 and the output ports 104, 106, 108 and 110. As can be seen with reference to FIG. 4, the low frequency (0 MHz to 200 MHz) isolation of the splitter device 200 is improved or enhanced in comparison to the splitter device 100 and is greater than 40 dB. In some embodiments, the capacitor 204 may have a 3.3 pF capacitance, the inductor 206 may have a 27 nH inductance and the resistor 208 may have a 75 Ohm resistance, the values of which may be selected to improve the input port to output port isolation for the frequency band of the input signal, although other values could be used. The resistor 208 has a resistance selected to increase return loss (minimize reflections) at the input port 102 in the frequency ranges of 5 to 1000 MHz. Additionally, as can be seen with reference to FIG. 4, the splitter device 200 provides enhanced isolation in the frequency range of 5 to 600 MHz as compared to the splitter device 100.

Figure 3:
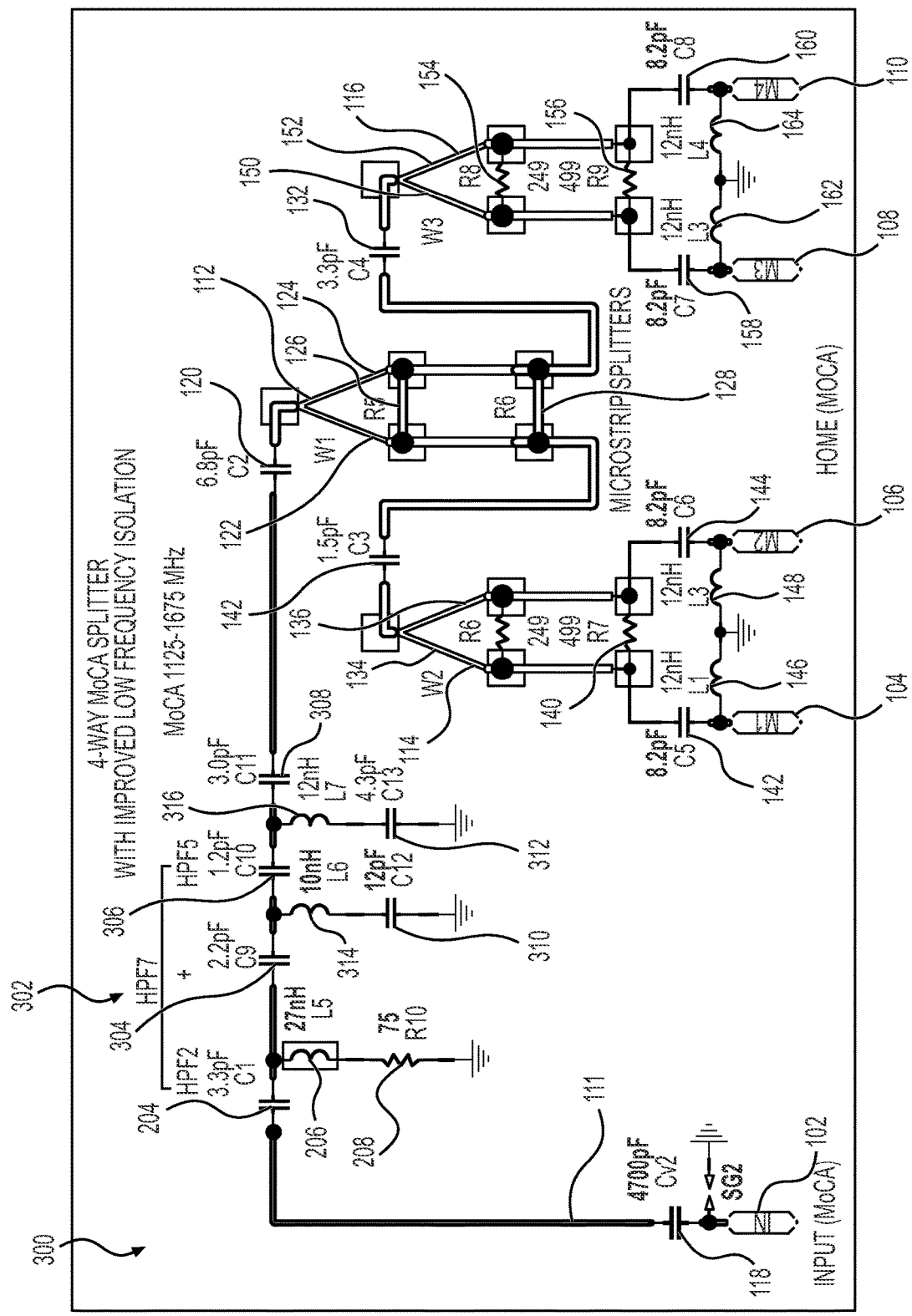
FIG. 3 illustrates a schematic view of a four-way splitter device in accordance with aspects of the present disclosure.

FIG. 3 illustrates a schematic view of a four-way splitter device 300 according to embodiments of the disclosure. Elements of the four-way splitter device 300 that are common with and connected in a same manner as in the splitter device 100 and 200 of FIGS. 1 and 2 share like reference numerals. The splitter device 300 also includes a high pass filter (HPF) 302, also marked in FIG. 3 as HPF7. In some embodiments, the HPF 302 may be a seventh order high pass filter, that may include a second order high pass filter HPF2 and a fifth order high pass filter HPF5. The second order high pass filter HPF2 may include capacitor 204, inductor 206 and resistor 208. The high pass filter HPF5 may include capacitors 304, 306, 308, 310 and 312, and inductors 314 and 316. In some embodiments, capacitor 304 may have a 2.2 pF capacitance, capacitor 306 may have a 1.2 pF capacitance, capacitor 308 may have a 3.0 pF capacitance, capacitor 310 may have a 12 pF capacitance and capacitor 312 may have a 4.3 pF capacitance, although other capacitance values could be used. In some embodiments, inductor 314 may have a 10 nH inductance and inductor 316 may have a 12 nH inductance, although other inductance values could be used.

Figure 4:
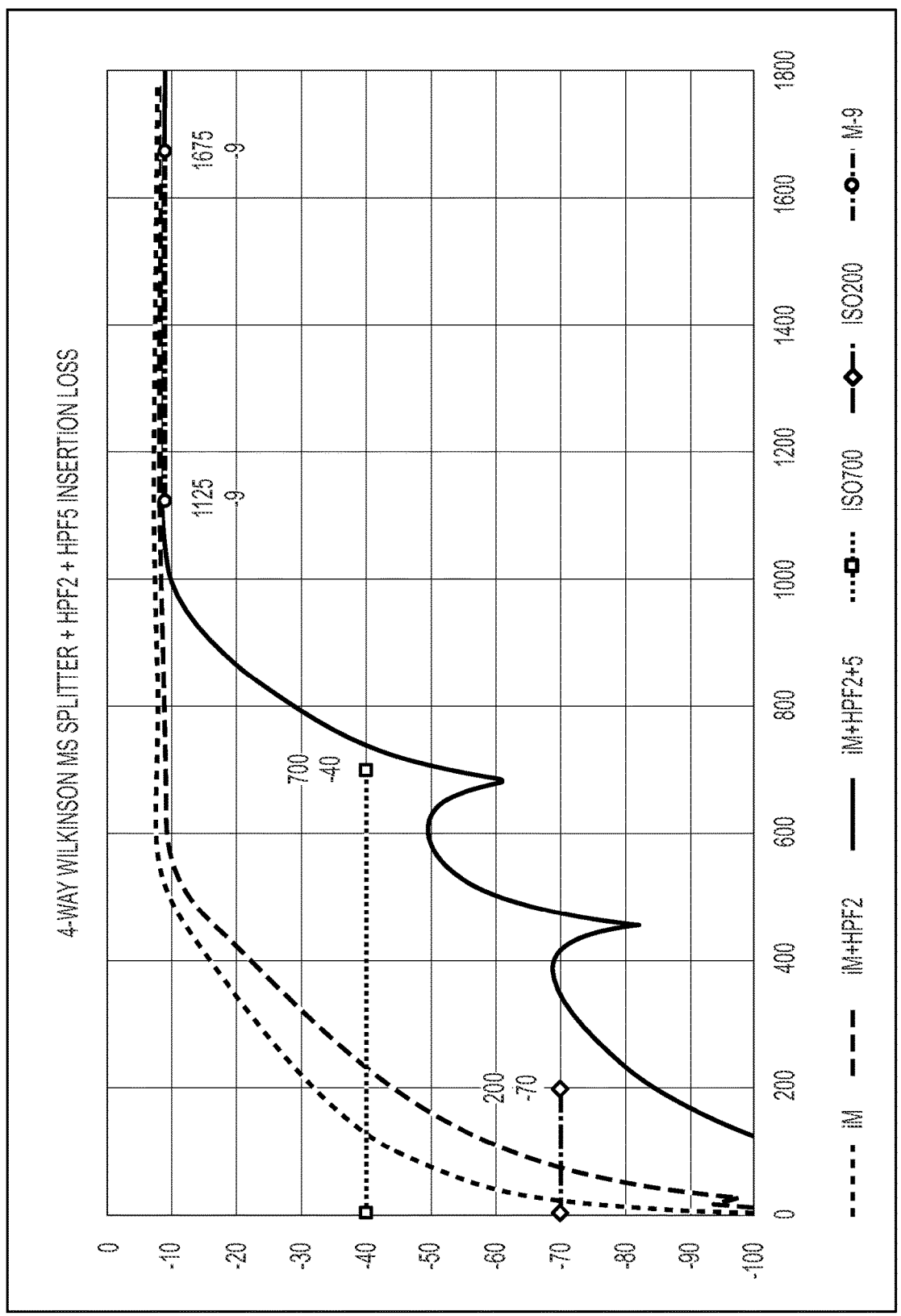
FIG. 4 illustrates a graph illustrating insertion loss between the input port and the output ports for splitter devices in accordance with aspects of the present disclosure.

HPF 302 in combination with the filtering elements (e.g., capacitive filters 120, 130, 132, and output filters including capacitors 142 and 144 and inductors 146 and 148) may collectively be referred to as a filter portion and are configured to provide enhanced input port to output port isolation of greater than 80 dB in a frequency range of from 0 to 200 MHz, to provide an enhanced input port to output port isolation of greater than 40 dB in a frequency range of 200 MHz to 700 MHz, and to provide an enhanced input port to output port isolation of less than 9 dB in a frequency range of 1125 MHz to 1675 MHz as shown in FIG. 4.

Figure 5:
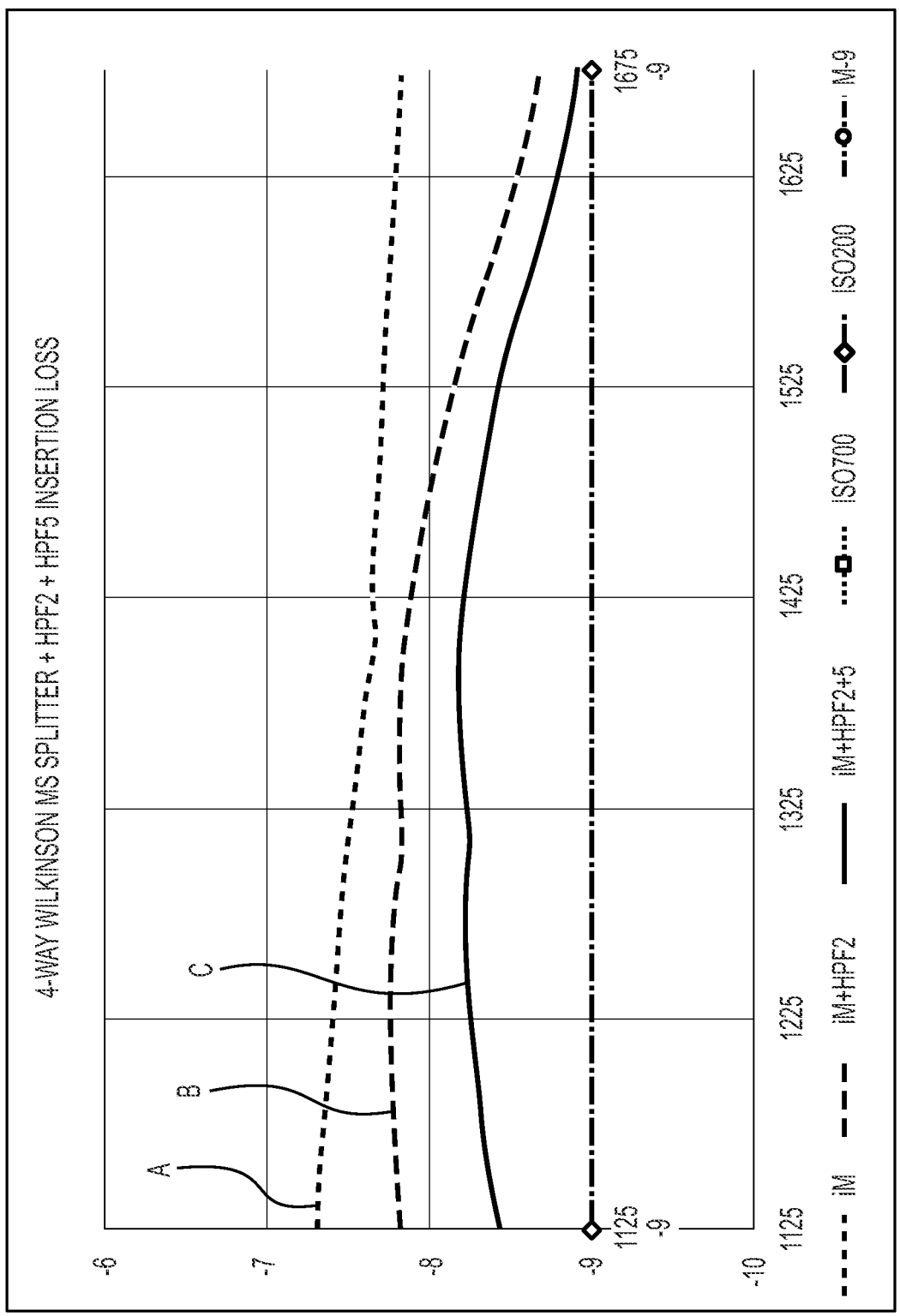
FIG. 5 illustrates a graph illustrating high frequency insertion loss for splitter devices in accordance with aspects of the present disclosure.

Plot A in FIG. 5 illustrates insertion loss (isolation) from the input port to the output ports for the splitter device 100 of FIG. 1. Plot A shows that the insertion loss for splitter device 100 is less than 9 dB in the frequency range of from 1125 to 1675 MHz.

Plot B in FIG. 5 illustrates insertion loss (isolation) from the input port to the output ports for the splitter device 200 of FIG. 2. Plot B shows that the insertion loss for splitter device 200 is less than 9 dB in the frequency range of from 1125 to 1675 MHz.

Plot C in FIG. 5 illustrates insertion loss (isolation) from the input port to the output ports for the splitter device 300 of FIG. 3. Plot C shows that the insertion loss for splitter device 300 is less than 9 dB in the frequency range of from 1125 to 1675 MHz.

Figure 6:
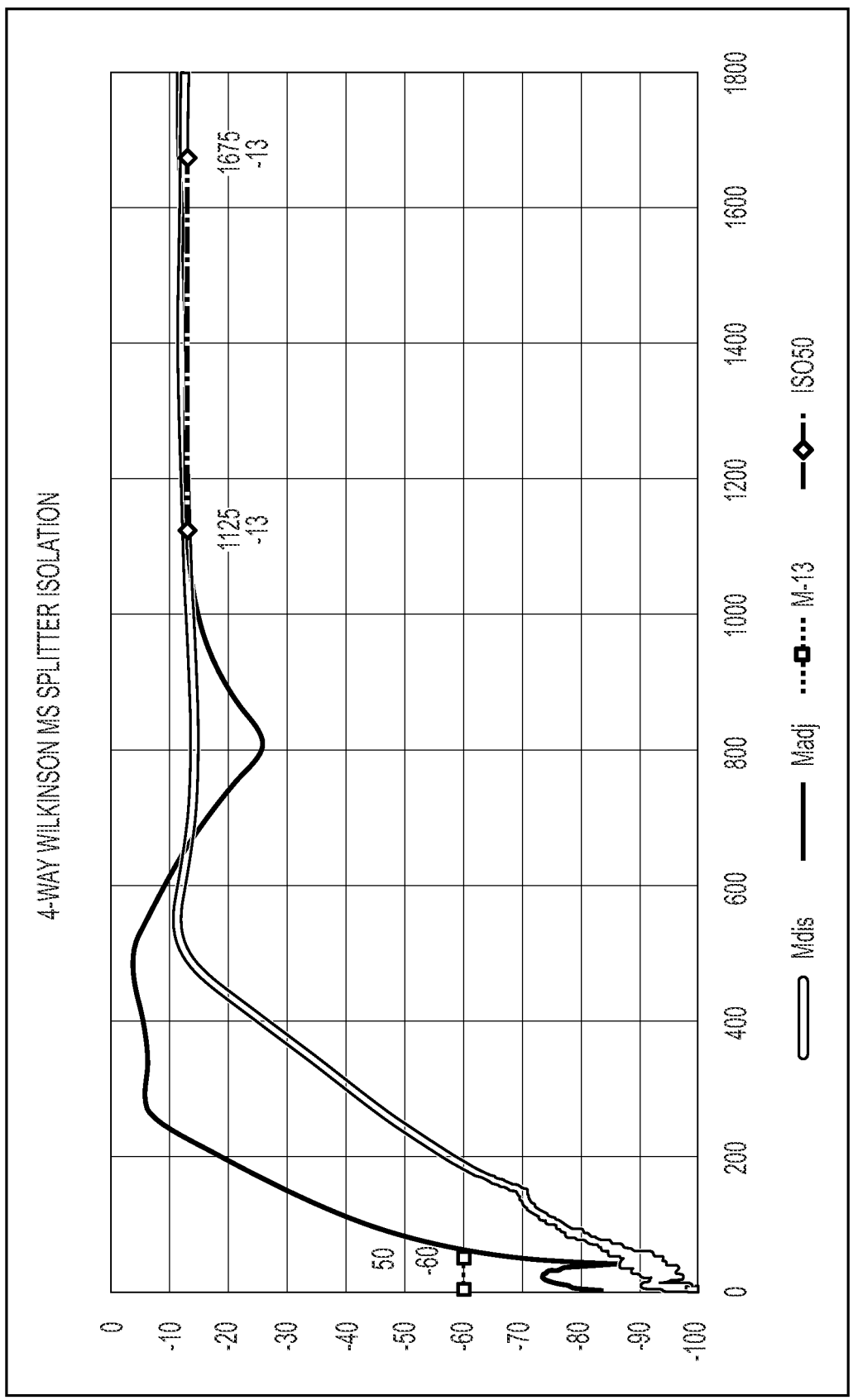
FIG. 6 illustrates a graph showing isolation between adjacent output ports and distant output ports in splitter devices in accordance with aspects of the present disclosure.

FIG. 6 illustrates splitter isolation for adjacent output ports (Madj) and for distant output ports (Mdis) for embodiments disclosed herein. The adjacent output ports are output portions or output portions that receive signals from a same one of the splitters 114, 116 connected to the output filter. The distant output ports are output ports or output portions that receive signals from a different one of the splitters 114, 116 connected to the output filter. In FIG. 6, adjacent port isolation is greater than 60 dB in a frequency range of 5 to 50 MHz, providing an improved level of low frequency transient and surge suppression.

Figure 7:
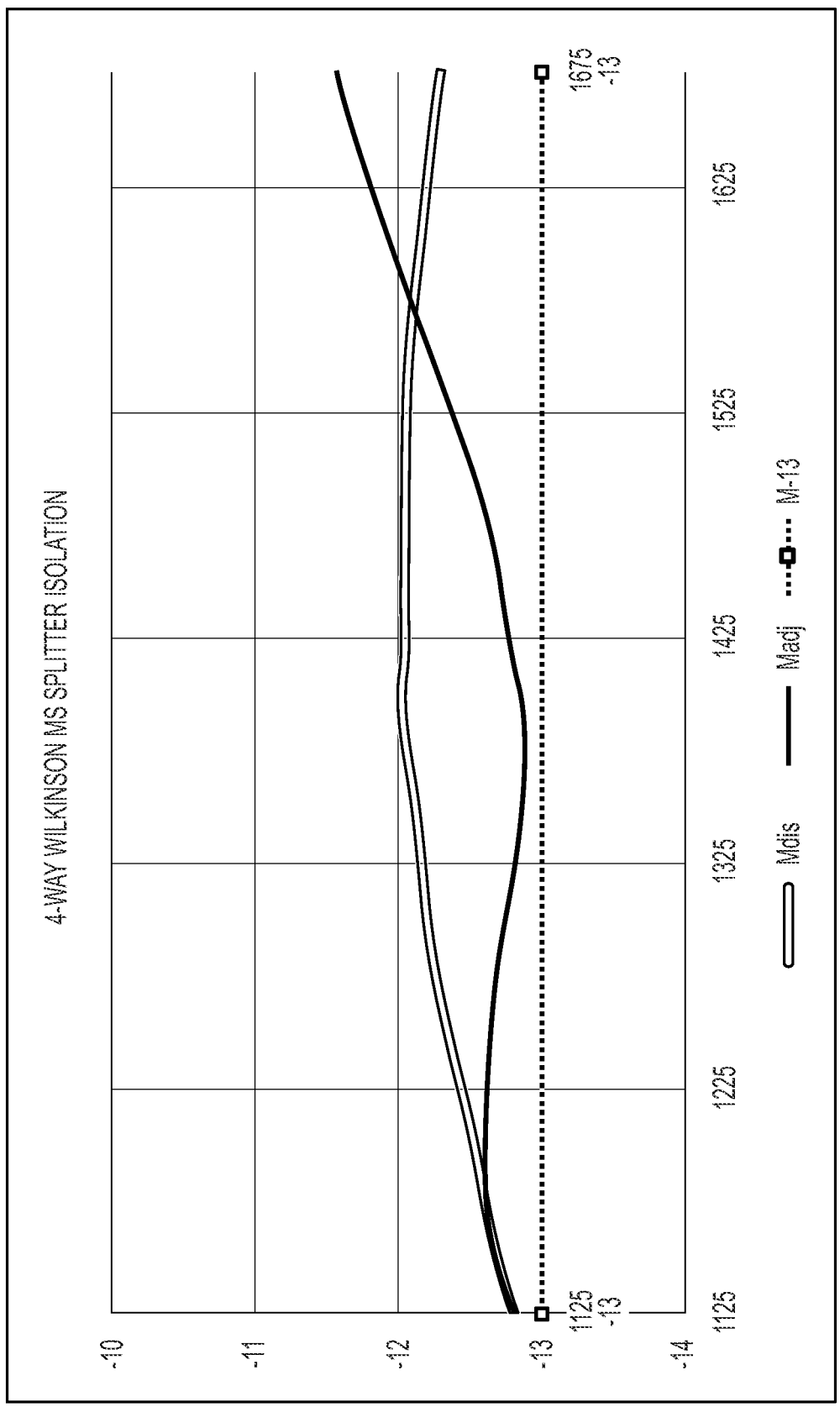
FIG. 7 illustrates a graph showing MoCA band isolation between adjacent output ports and distant output ports in splitter devices in accordance with aspects of the present disclosure.

FIG. 7 illustrates splitter isolation for adjacent output ports (Madj) and for distant output ports (Mdis) (e.g., distant output ports 104 and 110) in the frequency range of 1125 to 1675 MHz for embodiments disclosed herein. The isolation for adjacent ports and distant output ports is less than 12 dB in the frequency range of 1125 to 1675 MHz.

As described herein, embodiments of the disclosed splitter devices include one or more filters that may be configured to provide enhanced levels of isolation between the input port and the output ports, between adjacent and distant output ports and enhanced levels of input port to output port insertion loss.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What is claimed is:

1. A multi-level signal distribution device for providing a plurality of different enhanced isolation levels across different frequency bands, comprising:
   an input portion;
   a plurality of output portions;
   a splitter portion configured to split signals between the input portion and the plurality of output portions;
   a high pass filter portion configured to filter signals received from the input portion;
   a capacitive filter portion configured to capacitively filter signals between the high pass filter portion and the splitter portion;
   an output filter portion configured to filter output signals output from the splitter portion to the plurality of output portions;
   wherein the high pass filter portion, the capacitive filter portion, and the output filter portion are configured to provide a first enhanced isolation level between the input portion and the plurality of output portions in a first frequency band;

wherein the high pass filter portion, the capacitive filter portion, and the output filter portion are configured to provide a second enhanced isolation level between the input portion and the plurality of output portions in a second frequency band;

wherein the second frequency band is different from the first frequency band;

wherein the high pass filter portion, the capacitive filter portion, and the output filter portion are configured to provide a third enhanced isolation level between the input portion and the plurality of output portions in a third frequency band;

wherein the third frequency band is different from the first frequency band and the second frequency band;

wherein the splitter portion comprises a plurality of splitter portions;

wherein the high pass filter portion, the capacitive filter portion, and the output filter portion are configured to provide a first adjacent output portion enhanced isolation level between adjacent ones of the plurality of output portions in a fourth frequency band;

wherein the adjacent ones of the plurality of output portions comprise output portions that receive signals from a same one of the plurality of splitter portions;

wherein the high pass filter portion, the capacitive filter portion, and the output filter portion are configured to provide a first distant output portion enhanced isolation level in the fourth frequency band between distant ones of the plurality of output portions;

wherein the distant ones of the plurality of output portions comprise output portions that receive signals from different ones of the plurality of splitter portions;

wherein the high pass filter portion, the capacitive filter portion, and the output filter portion are configured to provide a second adjacent output portion enhanced isolation level between the adjacent ones of the plurality of output portions in the third frequency band;

wherein the high pass filter portion, the capacitive filter portion, and the output filter portion are configured to provide a second distant output portion enhanced isolation level between the distant ones of the plurality of output portions in the third frequency band;

wherein the first adjacent output port enhanced isolation level and the first distant output port enhanced isolation level comprise greater than a 60 dB isolation level;

wherein the second adjacent output port enhanced isolation level and the second distant output port enhanced isolation level comprise less than a 13 dB isolation level;

wherein the high pass filter comprises a resistive element configured to provide a predetermined reflection level to the input portion in a fifth frequency band; and wherein the predetermined reflection level comprises a greater than 18 dB reflection level and the fifth frequency band comprises a 5 MHz to 1000 MHz frequency band.

2. The device of claim 1, wherein the splitter device input portion comprises a splitter device input port, the first splitter device output portion comprises a first splitter device output port, and the second splitter device output portion comprises a second splitter device output port.

3. The device of claim 1, wherein the first frequency band comprises 0 MHz to 200 MHz, and the first enhanced isolation level comprises greater than 70 dB.

4. The device of claim 1, wherein the second frequency band comprises 200 MHz to 700 MHz, and the second enhanced isolation level comprises greater than 40 dB.

5. The device of claim 1, wherein the third enhanced isolation level comprises less than 9 dB, the third frequency band comprises 1125 MHz to 1675 MHz, and the fourth frequency band comprises 0 MHz to 50 MHz.

6. The device of claim 1, wherein the high pass filter portion, the output filter portion, and the capacitive filter portion are configured to provide an enhanced insertion loss between the input portion and the plurality of output portions.

7. The device of claim 6, wherein the enhanced insertion loss comprises less than 9 dB.

8. The device of claim 1, wherein the high pass filter portion comprises either a second order high pass filter or a seventh order high pass filter.

9. A multi-level signal distribution device for providing different enhanced isolation levels across different frequency bands comprising:
an input portion;
a plurality of output portions;
a splitter portion configured to split signals between the input portion and the plurality of output portions;
a filter portion configured to provide a first enhanced isolation level between the input portion and the plurality of output portions at a first frequency band, a second enhanced isolation level between the input portion and the plurality of output portions at a second frequency band, and a third enhanced isolation level between the input portion and the plurality of output portions at a third frequency band;

wherein first enhanced isolation level, the second enhanced isolation level, and the third enhanced isolation level are different from one another;

wherein the first frequency band, the second frequency band, and the third frequency band are different from one another;

wherein the splitter portion comprises a plurality of splitter portions;

wherein the filter portion is configured to provide a first adjacent output portion enhanced isolation level between adjacent ones of the plurality of output portions and a first distant output portion enhanced isolation level between distant ones of the plurality of output portions in a fourth frequency band;

wherein the filter portion is configured to provide a second adjacent output portion enhanced isolation level between the adjacent ones of the plurality of output portions and a second distant splitter output portion enhanced isolation level between the distant ones of the plurality of output portions in the third frequency band;

wherein the adjacent output portions comprise output portions that receive signals from a same one of the plurality of splitter portions;

wherein the distant output portions comprise output portions that receive signals from different ones of the plurality of splitter portions;

wherein the filter portion comprises a high pass filter portion configured to be connected between the input portion and the splitter portion; and wherein the high-pass filter portion comprises a resistive element that is configured to minimize reflections greater than a predetermined reflection level at a fifth frequency band to the splitter device input portion, and wherein the predetermined reflection level comprises a greater than 18 dB reflection level and the fifth frequency band comprises a 5 MHz to 1000 MHz frequency band.

10. The device of claim 9, wherein the input portion comprises an input port, and the plurality of output portions comprises a plurality of output ports.

11. The device of claim 9, wherein the first frequency band comprises 0 MHz to 200 MHz, the second frequency band comprises 200 MHz to 700 MHZ, and the third frequency band comprises 1125 MHz to 1675 MHz.

12. The device of claim 9, wherein the first enhanced isolation level comprises greater than 70 dB, the second enhanced isolation level comprises greater than 40 dB, and the third enhanced isolation level comprises less than 9 dB.

13. The device of claim 9, wherein the filter portion comprises a capacitive filter portion configured to be connected between the high pass filter portion and the splitter portion.

14. The device of claim 9, wherein the filter portion comprises an output filter portion configured to be connected between the splitter portion and the plurality of output portions.

15. The device of claim 9, wherein the high pass filter portion comprises a second order high pass filter or a seventh order high pass filter.

16. A multi-level signal distribution device for providing different enhanced isolation levels across different frequency bands, comprising:
an input portion;
a plurality of output portions;
a splitter portion configured to split signals between the input portion and the plurality of output portions;
a filter portion configured to provide a first enhanced isolation level between the input portion and the plurality of output portions at a first frequency band, a second enhanced isolation level between the input portion and the plurality of output portions at a second frequency band, and a third enhanced isolation level between the input portion and the plurality of output portions at a third frequency band;
wherein first enhanced isolation level, the second enhanced isolation level, and the third enhanced isolation level are different from one another;
wherein the first frequency band, the second frequency band, and the third frequency band are different from one another;
wherein the filter portion comprises a high pass filter portion configured to be connected to the input portion, a capacitive filter portion configured to be connected to the high pass filter portion, and an output filter portion configured to be connected to the splitter portion; and
wherein the high-pass filter portion comprises a resistive element that is configured to minimize reflections greater than a predetermined reflection level at a fifth frequency band to the input portion.

17. The device of claim 16, wherein the first frequency band comprises 0 MHz to 200 MHz, the second frequency band comprises 200 MHz to 700 MHZ, and the third frequency band comprises 1125 MHz to 1675 MHz.

18. The device of claim 16, wherein the first enhanced isolation level comprises greater than 70 dB, the second enhanced isolation level comprises greater than 40 dB, and the third enhanced isolation level comprises less than 9 dB.

19. The device of claim 16, wherein the splitter device input portion comprises an input port, and the plurality of splitter device output portions comprise a plurality of output ports.

20. The device of claim 16, wherein the predetermined reflection level comprises a greater than 18 dB reflection level and the fifth frequency band comprises a 5 MHz to 1000 MHz frequency band.

21. The device of claim 16, wherein the filter portion comprises either a second order high pass filter portion or a seventh order high pass filter portion.

22. The device of claim 16, wherein the filter portion comprises a capacitive filter portion that is configured to capacitively filter signals transmitted from the input portion to the plurality of output portions.

23. The device of claim 16, wherein the splitter portion comprises a plurality of splitter portions, wherein the filter portion is configured to provide a first adjacent output portion enhanced isolation level between first adjacent ones of the output portions and a first distant output portion enhanced isolation level between first distant ones of the output portions in a fourth frequency band and a second adjacent output portion enhanced isolation level between second adjacent ones of the output portions and a second distant output portion enhanced isolation level between second distant ones of the output portions in the third frequency band.

24. The device of claim 23, wherein the first adjacent output portion enhanced isolation level comprises greater than 60 dB, the second adjacent splitter output port enhanced isolation level comprises less than 13 dB, the fourth frequency band comprises 0 MHz to 50 MHz, the first distant output portion enhanced isolation level comprises greater than 60 dB, and the second distant output portion enhanced isolation level comprises less than 13 dB.

25. The device of claim 24,
wherein the adjacent output portions comprise output portions that receive signals from a same one of the plurality of splitter portions; and
wherein the distant output portions comprise output portions that receive signals from different ones of the plurality of splitter portions.

* * * * *